UNITED STATES PATENT OFFICE.

OTTO LIEBKNECHT AND ALOIS SCHAIDHAUF, OF FRANKFORT-ON-THE-MAIN, GERMANY, ASSIGNORS TO ROESSLER AND HASSLACHER CHEMICAL COMPANY, OF NEW YORK, N. Y., A CORPORATION OF NEW YORK.

STABLE HYDROGEN PEROXID AND METHOD OF MAKING THE SAME.

1,213,921. Specification of Letters Patent. Patented Jan. 30, 1917.

No Drawing. Application filed May 1, 1913. Serial No. 764,931.

*To all whom it may concern:*

Be it known that we, OTTO LIEBKNECHT and ALOIS SCHAIDHAUF, both subjects of the German Emperor, and residents of Frankfort-on-the-Main, Germany, have invented certain new and useful Improvements in Stable Hydrogen Peroxid and Methods of Making the Same, of which the following is a specification.

This invention relates to a stable hydrogen peroxid and method of making the same.

The problem of preserving the stability of solutions containing oxygen in available form, or carrying such oxygen, as for instance of hydrogen peroxid solution is very important.

Hydrogen-peroxid solutions are used for many industrial purposes. Though a great many chemicals have been suggested to produce the stabilizing effect on the hydrogen peroxid solutions the latter are usually wanting for some reason, in so far as the stabilizing agent mostly creates an undesirable effect on the other substances with which the hydrogen peroxid is brought into relation. Thus the nature of a suitable stabilizing agent for hydrogen-peroxid solution is very important. Up to now these stabilizing agents have mostly taken effect when the hydrogen peroxid solution has been of either neutral or acid reaction, very few of these agents working in an alkaline solution.

We have now discovered a process for stabilizing any hydrogen peroxid solution and other solutions containing oxygen in available form immaterial of the nature of its reaction.

We have found that a far-reaching importance must be attributed to the insoluble tin compounds, especially to stannic acid, in regard to their effect on hydrogen peroxid as well as other substances containing oxygen in available form.

The tin compounds do not behave indifferently toward alkaline hydrogen peroxid solutions, but act in a most favorable way on their stability, regardless of whether these solutions are of acid, neutral or alkaline reaction. It is to be especially noted that the solutions formed by the addition of tin compounds are immune to the decomposing action of catalyzers of any kind, the presence of small amounts only of such tin compounds being necessary to produce this effect. The hydrogen peroxid may be stored in vessels of any kind if any of such tin compounds is present, or it may be forwarded or used, without danger of decomposition, incurring loss of oxygen and regardless of whether it is of alkaline, acid or neutral reaction.

The efficiency of the tin compound even goes so far that hydrogen peroxid solutions, already being in the state of decomposition, may be saved although it has been believed up to now that such solutions are hopelessly lost. It must furthermore be noted that this stabilizing effect of the insoluble tin compounds is produced by such extremely small quantities that the price of the product is not influenced in any way thereby.

Our new process posseses a special merit in the fact that it does not require the absence of catalyzers in the solution or making for instance, an alkaline reaction of the bath a condition for the success of the bath.

The following example serves to illustrate our invention: We add to a 21% hydrogen peroxid solution, containing for instance 2 grams of sodium hydrate per liter and therefore showing alkaline reaction, about 0.1 gram of precipitated stannic acid. A like alkaline solution without the addition of stannic acid was heated up to 65° C. and was completely decomposed after two hours, whereas a solution containing stannic acid, which was treated under the same circumstances and for the same length of time still showed 91.2% of the hydrogen peroxid. The same stabilizing effect may be also obtained in neutral or acid hydrogen peroxid solutions as seen from the following tables; (it may be stated with regard to the following figures that the same do not include consideration of the influence due to evaporation of water during the heating and that the figures given only represent the percentage by weight, thus indicating the respective concentration of hydrogen peroxid at the various times.)

*Acid hydrogen peroxid solution, containing 1% sulfuric acid.*

| | Beginning. | After 6 hours at 90°. | After further 18 hours at 55°. | After further 6 hours at 90°. |
|---|---|---|---|---|
| 100 cc. $H_2O_2$ solution without addition | 18.1 / 18.15 | 15.85 / 16.0 | 15.3 / 15.5 | 12.9 / 13.6 |
| 100 cc. $H_2O_2$ solution with 0.015 g. $Sn(OH)_4$ | 18.1 / 18.1 | 18.65 / 18.45 | 18.85 / 18.7 | 21.5 / 20.8 |
| 100 cc. $H_2O_2$ solution with 0.03 g. $Na_2SnO_3$ | 18.05 / 18.15 | 17.7 / 17.25 | 17.5 / 16.95 | 18.6 / 17.0 |

*Neutral hydrogen-peroxid solution.*

The applied solution, containing 1% sulfuric acid, was carefully neutralized.

| | Beginning. | After 5 hours at 90°. | After further 16 hours at 55°. | After further 6 hours at 90°. |
|---|---|---|---|---|
| 100 cc. $H_2O_2$ neutralized with 4 cc. 5.5n NaOH | 16.8 / 16.8 | 7.75 / 6.9 | 7.35 / 6.2 | 6.95 / 6.0 |
| 100 cc. $H_2O_2$ neutralized with 3.2 cc. 5.5n NaOH +0.36 g. $Na_2SnO_3$ | 16.85 / 16.8 | 17.4 / 17.9 | 17.3 / 18.35 | 16.85 / 22.4 |

In all these cases the freshly precipitated stannic acid may be substituted by metastannic acid or some tin salt which gives stannic acid, as for instance sodium-tin chlorid, sodium stannate or also by some insoluble salt of stannic acid as for instance, stannophosphate. A considerable stabilizing effect is also produced if tin ash (anhydrous stannic acid) is added to the hydrogen peroxid solutions. In case one adds stannous oxid or its salts to hydrogen peroxid solutions the same are of course oxidized to stannic acid or its salts and thus also produce a stabilizing effect in the sense of the present invention. Other solutions, which like hydrogen peroxid also contain oxygen in available form, behave in the same way as, for instance a solution of a persalt, such as a perborate, which carries such oxygen. By the addition of stannic acid etc. the oxidizing effect of the solutions coming into consideration is not decreased; this fact is of considerable value for the various kinds of bleaching baths and represents a great advantage because a useless generation of oxygen is avoided thereby.

The degree of alkalinity may vary within a wide range, the stabilizing effect of the tin compounds not being lowered thereby. Furthermore the alkali material to be added to the solution may also greatly vary. Thus for instance solutions containing hydrogen peroxid or perborate may simultaneously be charged with considerable quantities of soap, water glass and soda and even yet may be preserved by the addition of tin compounds, such as sodium-stannichlorid, so that they may be used with very great success to bleach wool in copper vessels for instance.

We do not restrict ourselves to any of the details hereinabove given further than the scope of the appended claims demand.

We claim:

1. The method of rendering a solution, containing substances carrying oxygen in available form, stable which consists in adding an insoluble tin compound to the solution.

2. The method of rendering a hydrogen peroxid solution stable, which consists in adding an insoluble tin compound to said solution.

3. A solution containing a substance carrying oxygen in available form and an insoluble tin compound.

4. A hydrogen peroxid solution, containing an insoluble tin compound.

In testimony whereof we have signed our names to this specification in the presence of two subscribing witnesses.

OTTO LIEBKNECHT.
ALOIS SCHAIDHAUF.

Witnesses:
JEAN GRUND,
CARL GRUND.